Oct. 21, 1952 W. J. BUFF 2,614,780
SURVEYING INSTRUMENT TRIPOD HEAD
Filed Jan. 30, 1951

INVENTOR.
William J. Buff
BY
Lyman E. Dodge
ATTORNEY.

Patented Oct. 21, 1952

2,614,780

UNITED STATES PATENT OFFICE 2,614,780

SURVEYING INSTRUMENT TRIPOD HEAD

William J. Buff, Monmouth Beach, N. J.

Application January 30, 1951, Serial No. 208,476

1 Claim. (Cl. 248—177)

This invention relates to surveying instruments especially transits, theodolites, and levels and particularly to the tripod therefor.

A principal object of this invention is to provide a construction of tripod heads which will facilitate the attachment thereto of the trivet plate or base of transits, theodolites, levels and the like provided with trivet plates or bases of various diameters and formed with various pitch screw-threads.

Another object of the invention is to provide a device of the type specified in which the tripod head will be so constructed that trivet plate receiving means are easily removable and replaceable.

Other objects and advantages will appear as the description of the particular physical embodiment selected to illustrate the invention progresses and the novel features will be particularly pointed out in the appended claim.

Figure 1:
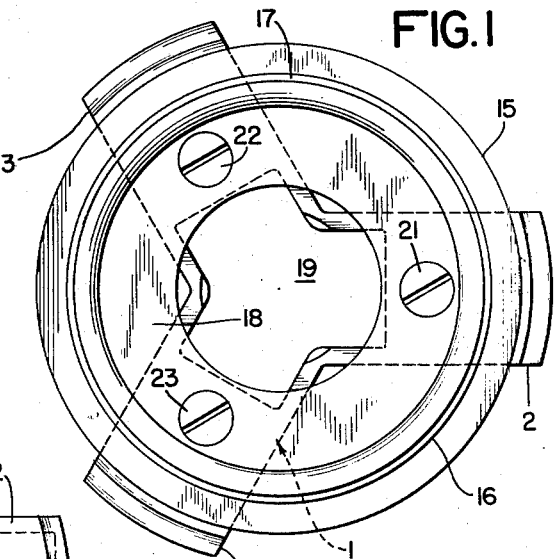
Figure 3:
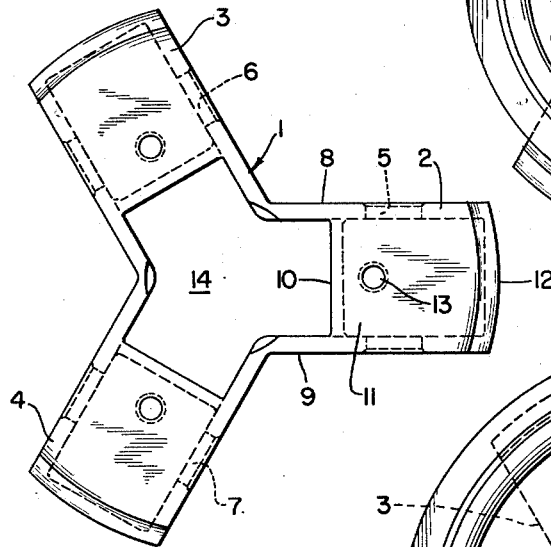
Figure 2:
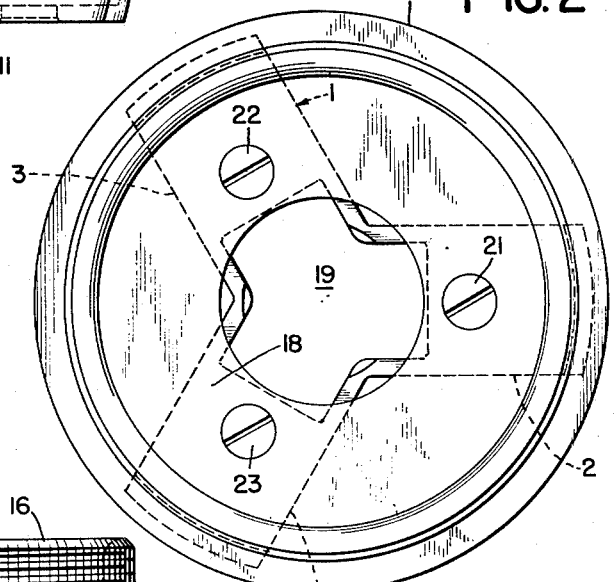
Figure 4:
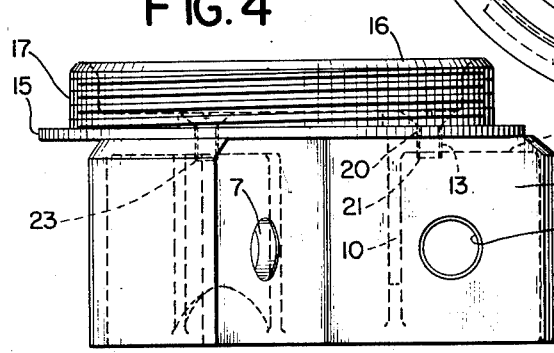

In describing the invention in detail and the particular physical embodiment selected to illustrate the invention, reference will be had to the accompanying drawings and the several views thereon, in which like characters of reference designate like parts throughout the several views, and in which:

Fig. 1 is a top plan view of a tripod head with my invention applied thereto; Fig. 2 is a top plan view of a tripod head with my invention applied thereto with a different diameter trivet plate shown therein; Fig. 3 is a top plan view of the spider of my improved tripod head; Fig. 4 is a side elevational view of the device as shown by Fig. 1.

It is well known by those familiar with the art of transits, theodolites, levels, plane tables, meteorological instruments and the like that they are commonly supported by a three legged support. This tripod generally includes a spider at the top having three branches to each of which a leg of the tripod is attached. This spider has a flanged screw-threaded boss formed integral with the spider.

The instrument to be supported by the tripod is formed with an internally screw-threaded collar or trivet plate which corresponds in internal diameter and pitch of thread to that of the flanged boss on the top of the spider so that the two may be attached together by screw-threading one upon the other.

It is also well known that the various makes of instruments are not provided with the trivet plate all of the same internal diameter and screw-thread pitch. There is almost always a decided variance between the American made instruments and foreign made instruments.

The result of the condition mentioned, is that a complete tripod must be supplied for each type of instrument. If the tripod head for a particular instrument becomes damaged, it is necessary to make a complete tripod head, including the spider, for the instrument. This condition is especially undesirable for the suppliers of tripods and tripod heads because of the large amount of costly material which must lie idle in a stock of tripod heads.

My invention obviates the difficulties of the present conditions. My invention separates the spider from the trivet receiving threaded boss. By my invention, one may make spiders of universal application. To prepare such a spider as a tripod head for a given instrument, it is only necessary to select the proper flanged trivet plate receiving screw-threaded boss and attach the same to the spider.

In the practice of my invention I provide a spider 1, usually having three branches 2, 3 and 4. Each of these branches is provided with through orifices as 5, 6 and 7. These orifices serve to receive the pin which is used to pass through the upper part of the bifurcated tripod leg.

In order to strengthen the sides, as 8 and 9, of a branch, I provide a web 10 extending from side to side and from top to bottom.

I also provide in each of the branches a bolt receiving web as 11. This web is of a suitable thickness and extends from the web 10 to the sides as 8 and 9 and the end as 12.

The above construction of my spider with the webs 10 and 11 very greatly strengthens the spider so that a little extra stress is not likely to distort the spider.

In each of the webs 11, I provide a screw-threaded bore 13.

The spider 1 is readily attached to each of the three legs of a tripod and presents a plane upper surface and also a through space as at 14 suitable for passing various needed instrumentalities, such as the cord supporting a plumb bob to the center of the instrument to be attached and supported by the tripod.

In order to provide for attaching an instrument to the spider of the tripod, I provide a separable flanged plate as 15. This flanged plate has a boss 16 integral therewith extending at a right angle thereto. The boss is screw-threaded as at 17. The flange plate 15 has a web 18 in the form of an annulus as it has an opening 19.

The web 18 is formed with through bores, as 20. In the bores, as 20, I place a plurality of bolts or screws 21, 22, and 23. These screws are so positioned that they line up with the screw-threaded bores, as 13, in the webs 11 so that by means of the screws I firmly attach the flange plate 15 to the spider 1.

Of course I have shown flat-headed screws as the fastening means, but I do not intend to exclude other forms of screws or even bolts as the fastening means as any suitable and proper fastening means may be used.

The flange plates 15 must be made and stocked separate and independent from the spiders 1. Furthermore the flange plates 15 may be made of any external diameter and the outside diameter of the boss thereof, as 17, may be made of any external diameter and provided with any form or pitch of any external diameter and provided with any form or pitch of screw-thread as 17. In Fig. 2 I have shown a flange plate 24 of a larger diameter than the flange plate 15 of Fig. 1. From this view it can be seen that the flange plate may be made of a diameter such that it projects beyond the ends of the spiders' branches as 2, 3 and 4.

Of course I do not intend to confine my invention to a flange plate, as 15, with the particular form of boss, as 16, thereon, because the boss may be made of any suitable or appropriate shape.

It will be noted that the web 18 having the opening 19 therein allows a through space from top to bottom of the tripod head, so that space is provided for either a plumb bob string, as is usual, or the usual projection with spring and nut as is applied to those surveying instruments which are commonly operated by three leveling screws instead of four.

From the hereinbefore given description it will now be understood that I have provided a tripod head of extremely simple design which allows the manufacturer to stock the spider thereof with assurance that it may be used in making a complete tripod head regardless of the type of instrument to be fitted. The manufacturer may also stock the commonly required flange plates 15 of the proper diameter and the proper boss and type of screw-thread and pitch of screw-thread as will be most commonly required by the various type of instruments usually supplied with tripods. It is also to be understood that one having a large number of instruments, such as transits, theodolites and levels, may have a minumum number of tripods, and flange plates, as 15, suitable for receiving the various instruments, and may, for the purpose of using one particular instrument, remove one type of flange 15 from the spider 1 and replace it by another type of flange plate, such as flange plate 24. In this way the number of tripods needed may be materially reduced.

Not only is my improved tripod head suitable for transit, theodolites and levels, but it is also suitable for supporting a plane table. In that case it might well be that the plane table would be secured directly to the spider 1 or after the interposition of a flange plate such as 15.

In addition to supporting the usual instrument for surveying, the tripod is also useful for supporting the somewhat similar instruments, such as meteorologic instruments.

Although I have particularly described one particular physical embodiment of my invention and explained the construction and principle thereof, nevertheless, I desire to have it understood that the form selected is merely illustrative, but does not exhaust the possible physical embodiments of the idea of means underlying my invention.

What I claim as new and desire to secure by Letters Patent is:

A tripod head for supporting instruments provided with an internally threaded trivet plate, including, in combination a spider, formed with a plurality of branches each formed with two side walls and an end wall with a through bore in the side walls to receive a pin adapted to pass through and attach the upper end of a tripod leg, each branch formed with a web at a right angle to and connecting the two side walls, each web formed with a threaded orifice, and a separable flange plate formed with a boss provided with a screw-thread, said flange plate formed with an annular web extending toward the center of the plate, said annular web formed with through bores all within the inner diameter of the threaded boss aligning with the bores in the webs of the spider branches and screw-threaded fastening means passing through the bores of the annular web and cooperating with the through threaded bores of the webs of the spider branches.

WILLIAM J. BUFF.

REFERENCES CITED

The following references are of record in the file of this patent:

UNITED STATES PATENTS

| Number | Name | Date |
|---|---|---|
| 588,552 | Brownell | Aug. 24, 1897 |
| 931,692 | Fyfe | Aug. 17, 1909 |

FOREIGN PATENTS

| Number | Country | Date |
|---|---|---|
| 235,849 | Great Britain | June 24, 1926 |
| 359,079 | Germany | Oct. 27, 1921 |